United States Patent [19]

Piejko et al.

[11] Patent Number: 5,266,642
[45] Date of Patent: Nov. 30, 1993

[54] PROCESS FOR THE PREPARATION OF ALPHA-METHYLSTYRENE POLYMERS

[75] Inventors: Karl-Erwin Piejko, Bergisch Gladbach; Ralph Ostarek, Duesseldorf; Christian Lindner, Cologne, all of Fed. Rep. of Germany

[73] Assignee: Bayer Aktiengesellschaft, Leverkusen, Del.X

[21] Appl. No.: 859,056

[22] Filed: Mar. 27, 1992

[30] Foreign Application Priority Data

Apr. 9, 1991 [DE] Fed. Rep. of Germany ....... 4111388

[51] Int. Cl.$^5$ ............... C08F 4/40; C08F 265/04; C08F 283/12
[52] U.S. Cl. .................... 525/262; 525/244; 525/263; 525/308; 525/309; 525/479
[58] Field of Search ............ 525/244, 262, 263, 308, 525/309, 479

[56] References Cited

U.S. PATENT DOCUMENTS

| | | | |
|---|---|---|---|
| 3,268,625 | 8/1966 | Jones et al. | 525/244 |
| 3,288,887 | 11/1966 | Yoshino et al. | 525/245 |
| 3,367,995 | 2/1968 | Yoshino et al. | |

FOREIGN PATENT DOCUMENTS

| | | |
|---|---|---|
| 0051336 | 5/1982 | European Pat. Off. |
| 0083946 | 7/1983 | European Pat. Off. |
| 3730205 | 3/1989 | Fed. Rep. of Germany |
| 2050391 | 1/1981 | United Kingdom |

*Primary Examiner*—Vasu S. Jagannathan
*Attorney, Agent, or Firm*—Connolly & Hutz

[57] ABSTRACT

An improved process for the preparation of α-methylstyrene polymers by aqueous emulsion polymerization in which a styrene monomer mixture is first polymerized in a quantity of from 0.5 to 8% by weight of the total quantity of monomers and thereafter an α-methylstyrene monomer mixture is polymerized batchwise or semi-continuously.

12 Claims, No Drawings

PROCESS FOR THE PREPARATION OF ALPHA-METHYLSTYRENE POLYMERS

α-Methylstyrene polymers are used as components of thermoplastic molding compounds which have exceptionally high heat deflection temperatures, e.g. ABS and PVC molding compounds. They may be prepared by conventional methods such as polymerisation in solution, solvent-free or in aqueous emulsion.

Emulsion polymerisation is technically simple, may be carried out batchwise or semi-continuously, and gives rise to particulate polymers but the process is frequently difficult to reproduce, especially when monomers which are difficult to polymerise are used, such as α-methylstyrene, and it frequently proceeds nonuniformly.

A uniform progress of polymerisation is, however, particularly important for semi-continuous processes in which monomers are continuously introduced into the polymerisation reactor over a specified period of time. In such processes it is necessary that the monomers react as rapidly as they are introduced into the reactor. A uniform progress of polymerisation with low static monomer concentrations is particularly difficult to achieve in the emulsion polymerisation of α-methylstyrene/monomer mixtures.

The present invention relates to a process for the preparation of α-methylstyrene polymers by emulsion polymerisation in an aqueous medium, in which a styrene monomer mixture of from 60 to 90% by weight of styrene, from 10 to 40% by weight of acrylonitrile and from 0 to 30% by weight of other vinyl monomers is polymerised in a first stage of the process and an α-methylstyrene monomer mixture of from 80 to 35% by weight of α-methylstyrene, from 10 to 40% by weight of acrylonitrile and from 0 to 55% by weight of methyl methacrylate, styrene or mixtures is polymerised in a second stage, the quantity of styrene monomer mixture amounting to 0.5 to 8% by weight of the total quantity of monomers and polymerisation being initiated by means of a radical initiator.

This polymerisation may also be carried out in the presence of a rubber latex to form graft polymers of the α-methylstyrene polymers on a rubber. Further, the polymerisation may be carried out batchwise or semi-continuously.

The process is distinguished by a uniform progress of polymerisation and gives rise to shear resistant latices of chemically uniform α-methylstyrene polymers.

The styrene monomer mixture consists of from 60 to 90% by weight, preferably from 65 to 80% by weight, of styrene, from 10 to 40% by weight, preferably from 20 to 35% by weight of acrylonitrile and from 0 to 30% by weight of other vinyl monomers, such as α-methylstyrene and methyl methacrylate. The "other vinyl monomers" are preferably absent.

The α-methylstyrene monomer mixture consists of from 80 to 35% by weight, preferably from 80 to 65% by weight, in particular from 75 to 67% by weight, of α-methylstyrene, from 10 to 40% by weight, preferably from 20 to 35% by weight, in particular from 25 to 33% by weight, of acrylonitrile and additionally from 0 to 55% by weight of methyl methacrylate and/or styrene. These additional monomers are preferably not present.

The quantity of styrene/monomer mixture amounts to from 0.5 to 8% by weight, preferably from 1 to 7% by weight, in particular from 3 to 5.5% by weight of the total quantity of monomers.

The quantity of styrene/monomer mixture indicated is critical. If it is not observed, the effect according to the invention either does not take place or the properties of the polymers, e.g. their heat deflection temperatures, are impaired.

The process according to the invention may be carried out as follows:

An aqueous emulsifier solution and the styrene/monomer mixture are introduced into a thermostatically controlled reaction tank and radical polymerisation is released by a suitable initiator system. The α-methylstyrene/monomer mixture is then added immediately or after the exothermic reaction has died down, preferably after 5 to 180 minutes, in particular after 10 to 60 minutes, the addition of the mixture being preferably distributed uniformly over a period of from 1 to 24 hours, in particular from 2 to 12 hours. Alternatively, the styrene/monomer mixture may be introduced into the reaction tank already containing the initiator system together with the emulsifier solution, and the process is then continued in the manner described above.

In a preferred embodiment of the process, polymerisation is carried out in the presence of rubber latices having rubber particle diameters ($d_{50}$) of from 60 to 800 nm. Suitable rubbers have glass temperatures below 0° C. and may consist, for example, of diene homo or copolymers, ethylene copolymers, acrylate rubbers and/or silicone rubbers or mixtures thereof. Acrylate rubbers and silicone rubbers are preferred. The rubbers are at least partially cross-linked and have gel contents above 30%, preferably above 75%.

The quantity of rubber in the resulting total polymer is from 0 to 50% by weight, preferably from 10 to 40% by weight, most preferably from 15 to 30% by weight. In this preferred embodiment, part of the polymer formed is chemically linked to the rubber particles. A graft polymer is obtained. Since the extent of grafting depends inter alia on the static monomer concentration, it is essential in this embodiment of the process to obtain a uniform progress of polymerisation with low static monomer concentrations. The reaction temperatures, quantitative ratios of the monomers and of the aqueous phases, the emulsifiers, the initiators and other auxiliary substances and additives may be chosen as in known processes for the emulsion polymerisation of α-methylstyrene/monomer mixtures (see EP-A 331 999).

Particularly suitable emulsifiers for the process according to the invention are anionic emulsifiers such as carboxylic acids and sulphonic acids and their salts, such as resinic acids, sulphonated fatty acids, alkyl sulphonic acids, aryl sulphonic acids and their alkali metal salts.

The pH of the polymerisation solution is from 1 to 12. When the preferred carboxylate emulsifiers are used, the pH is preferably from 8 to 11.

The use of carboxylate emulsifiers at pH values from 8 to 11 is particularly preferred.

In a preferred variation of the process, only part of the emulsifier or emulsifiers is introduced into the reaction vessel at the beginning of polymerisation and the remainder is added continuously over a particular period of time. This period of addition of emulsifier is preferably from half to twice the period of continuous addition of monomer and in particular is equal to the time taken for addition of the monomers, that is to say the monomers and the emulsifiers are added simultaneously and for the same length of time.

The proportion of the emulsifier originally introduced into the reaction vessel amounts to 5 to 80% of the total quantity of emulsifier, preferably from 10 to 50%.

Particularly suitable initiator systems for the preferred polymerisation process in the presence of rubbers are the combinations of organic hydroperoxides and ascorbic acid described in DE-OS 3 730 205.

Preferred variations of the process according to the invention operate with anionic emulsifiers, part of the emulsifiers being added as described above.

The process according to the invention leads to a rapid starting reaction, to a rapid consumption of monomers corresponding to the rate of input of monomers and to latices which are resistant to shearing.

The rapid consumption of monomers leads to low static monomer concentrations and hence chemically uniform polymers even outside the azeotropic composition. This is particularly important in the case of α-methylstyrene polymers since, for example, excessively long α-methylstyrene sequences result in thermally unstable polymers. The improved course of the reaction thus results in reproducibly improved polymers which suffer no loss, e.g. in the heat deflection temperature, in spite of the partial replacement of α-methylstyrene by styrene.

The polymers prepared according to the invention are particularly suitable as components of synthetic resin alloys having high heat deflection temperatures, such as ABS, ASA, PVC or polycarbonate blends.

EXAMPLES

Example 1

649 g of a coarse particled polybutyl acrylate rubber latex having a solids content of 37% by weight, an average particle diameter ($d_{50}$) of 480 nm and a gel content of 92% by weight, 821 g of deionized water and 10 mg of iron (II) sulphate are introduced into a reactor and heated to 61° C. under a light stream of nitrogen. The following solutions are added at this temperature:
Solution a:
4 g of cumene hydroxperoxide
90 g of water.
Solution b:
1 g of ascorbic acid
50 g of water.
Polymerisation is started by the addition of a mixture of 35 g of styrene and 15 g of acrylonitrile (Solution c).

After 35 minutes, the following solutions are added over a period of 6 hours and 40 minutes:
Solution d:
682 g of α-methylstyrene
282 g of acrylonitrile
Solution e:
350 g of water
35 g of the sodium salt of disproportionated abietic acid
36 g of 1 normal sodium hydroxide solution
5 g of cumene hydroperoxide
Solution f:
380 g of water
3 g of ascorbic acid.
Stirring is continued for 4 hours at 61° C. after all the solutions have been added.

Samples are removed at the times shown in Table 1 (starting with the addition of Solution c: t=0) and the solids content is determined. A conversion rate x is calculated from the solids content $F_t$ found and the solids content $F_m$ calculated (theoretically maximum obtainable) from the ratio of the quantity of monomers added and the total weight of the reaction mixture at time t, in accordance with the formula $x = F_t/F_m$.

A high conversion number x means that a high proportion of the monomers present in the reaction mixture is polymerised at the time of removal of the sample. x=100% means complete monomer conversion.

A relative value for the shearing stability in terms of the time required for coagulation is determined by stirring 100 g of the resulting latex with a high speed stirrer (10 000 revs per min) until coagulation takes place. Long times correspond to high shearing stabilities. Values for these are given in Table 1.

Example 2

The procedure is the same as in Example 1. The following solutions are used as Solutions a and b:
Solution a:
2 g of cumene hydroperoxide
90 g of water
Solution b:
0.5 g of ascorbic acid
50 g of water.
The results of the experiment are shown in Table 1.

Comparison Example 3

The procedure is the same as in Example 1. The following solutions are used as Solutions c and d:
Solution c:
35 g of α-methylstyrene
15 g of acrylonitrile
Solution d:
627 g of α-methylstyrene
283 g of acrylonitrile.
The results of the experiment are shown in Table 1.

TABLE 1

Conversion numbers and shearing stabilities from Examples 1 and 2 and comparison Example 3.

| Time t | conversion No x (%) Example No | | |
|---|---|---|---|
| | 1 | 2 | 3* |
| 1 h 15 min | 80 | 86.1 | 73 |
| 3 h 15 min | 76 | 91.2 | 47.5 |
| 5 h 15 min | 89 | 92.8 | 38.3 |
| 7 h 15 min | 92 | 90.7 | 49.6 |
| 11 h 15 min | 100 | 100 | 98 |
| Shearing stability (sec) | 100 | 80 | 3 |

*Comparison Example.

Examples 1 and 2 according to the invention show consistently high conversion numbers x in the course of polymerisation and good shearing stability numbers of the resulting latices whereas Comparison Example 3 has low conversion numbers x during polymerisation and a poor shearing stability. The low conversion numbers indicate a low rate of polymerisation and high static monomer concentrations in the Comparison Example.

Example 4

Solutions a and b are introduced into a reactor and heated to 77° C. under a light stream of nitrogen.
Solution a:
1400 g of water 8.5 g of the sodium salt of disproportionated abietic acid
4.8 g of 1 normal sodium hydroxide solution
Solution b:
180 g of water.

The experiment is started by the addition of a mixture of 50.4 g of styrene and 19.6 g of acrylonitrile (Solution c).

After 20 minutes, the following solutions are added over a period of 5 hours:
Solution d:
918 g of α-methylstyrene
412 g of acrylonitrile
1.3 g of tert. dodecylmercaptan
Solution e:
850 g of water
42 g of the sodium salt of disproportionated abietic acid
24 g of 1 normal sodium hydroxide solution. Stirring is continued for 4 hours at 83° C. after the solutions have been added.

The onset of polymerisation can be observed 2 minutes after the start of the experiment.

Conversion numbers are determined analogously to Example 1 after 1 h 20 min and 2 h 20 min. The values are shown in Table 2.

Comparison Example 5

The procedure is the same as in Example 4. The following solution is used as Solution c:
Solution c:
30 g of α-methylstyrene
13 g of acrylonitrile.

The onset of polymerisation can be observed 30 minutes after starting.

The results of the experiment are shown in Table 2.

TABLE 2

| Conversion numbers from Example 5 and Comparison Example 6. | | |
|---|---|---|
| | Conversion No. x (%) Example No. | |
| Time | 4 | 5* |
| 1 h 20 min | 69 | 48 |
| 2 h 20 min | 93 | 79 |

*Comparison Example

Example 6

Solutions a and b are introduced into a reactor and heated to 77° C. under a light stream of nitrogen.
Solution a:
2250 g of water
50.5 g of the sodium salt of disproportionated abietic acid
28.7 g of 1 normal sodium hydroxide solution
Solution b:
4.6 g of potassium peroxodisulphate
180 g of water.

The experiment is started by the addition of a mixture of 32.4 g of styrene and 12.6 g of acrylonitrile (Solution c).

After 20 minutes, the following solution is added over a period of 5 hours:
Solution d:
976 g of α-methylstyrene
379 g of acrylonitrile
1.3 g of tert. dodecylmercaptan.

Stirring is continued for 4 hours at 83° C. after all the solution has been added.

The onset of polymerisation can be observed 1 minute after the start of the experiment.

A conversion number is determined analogously to Example 1 after 1 h 20 min and found to be 71%.

Comparison Example 7

The procedure is the same as in Example 6. The following solution is used as Solution c:
Solution c:
32 g of α-methylstyrene
12 g of acrylonitrile.

The onset of polymerisation can be observed 20 minutes after the start.

A conversion number is determined after 1 h 20 min analogously to Example 1 and found to be 63%.

Examples 8 to 10

55% by weight of polyvinyl chloride and 45% by weight of the polymers prepared in Examples 1, 2 and 3 (Comparison) (after isolation by coagulation with magnesium sulphate solution followed by drying) are rolled to produce homogeneous molding compounds which are molded to form test plates at 190° C. The test plates each have a Vicat temperature (according to DIN 553460, Type B) of 94° C.

We claim:

1. A process for the preparation of α-methylstyrene polymers by emulsion polymerisation in an aqueous medium in which a styrene monomer mixture composed of 60 to 90% by weight of styrene, 10 to 40% by weight of acrylonitrile and 0 to 30% by weight of other vinyl monomers is polymerised in a first stage and a α-methylstyrene monomer mixture of 80 to 35% by weight of α-methylstyrene, 10 to 40% by weight of acrylonitrile and 0 to 55% by weight of at least one of methyl methacrylate and styrene is polymerised in a second stage, the quantity of styrene monomer mixture amounting to 0.8 to 8% by weight of the total quantity of monomers and polymerisation being initiated by a radical initiator.

2. A process according to claim 1, wherein polymerisation is carried out in the presence of a rubber latex of rubber particles having an average diameter ($d_{50}$) of from 60 to 800 nm in such a quantity that the resulting total polymer contains from 0 to 50% by weight of the rubber and further wherein said rubber is at least one of an acrylate rubber and a silicone rubber.

3. A process according to claim 1, wherein the initiator is a mixture of hydroperoxides and ascorbic acid.

4. A process according to claim 1, wherein the quantity of styrene monomer mixture is from 1 to 7% by weight of the total quantity of monomers.

5. A process according to claim 1, wherein the quantity of styrene monomer mixture is from 3 to 5.5% by weight of the total quantity of monomers.

6. A process according to claim 1, wherein the amount of styrene in the styrene monomer mixture is from 65 to 80% by weight.

7. A process according to claim 1, wherein the amount of acrylonitrile in the styrene monomer mixture is from 20 to 35% by weight.

8. A process according to coaim 1, wherein the other vinyl monomers are selected from the group consisting of α-methylstyrene and methyl methacrylate.

9. A process according to claim 1, wherein the amount of α-methylstyrene in the α-methylstyrene monomer mixture is from 80 to 65% by weight.

10. A process according to claim 1, wherein the amount of α-methylstyrene in the α-methylstyrene monomer mixture is from 75 to 67% by weight.

11. A process according to claim 1, wherein the amount of acrylonitrile in the α-methylstyrene monomer mixture is from 20 to 35% by weight.

12. A process according to claim 1, wherein the amount of acrylonitrile in the α-methylstyrene monomer mixture is from 25 to 33% by weight.

* * * * *